June 15, 1965 L. E. SUMNER 3,188,809
ROTARY INTERNAL COMBUSTION ENGINES
Filed Aug. 19, 1963 4 Sheets-Sheet 1

INVENTOR.
LESTER E. SUMNER
BY Alfred W. Petchaft
ATTORNEY

United States Patent Office 3,188,809
Patented June 15, 1965

3,188,809
ROTARY INTERNAL COMBUSTION ENGINES
Lester E. Sumner, Rte. 1, Box 79, Arnold, Mo.
Filed Aug. 19, 1963, Ser. No. 302,876
12 Claims. (Cl. 60—39.61)

This invention relates in general to certain new and useful improvements in rotary internal combustion engines.

It is the primary object of the present invention to provide a rotary internal combustion engine which is extremely efficient and will develop a high ratio of available power for its size and weight.

It is another object of the present invention to provide a rotary internal combustion engine which develops high compression on the fuel-intake portion of its cycle, and is, therefore, relatively easy to start and operate.

It is a further object of the present invention to provide a rotary internal combustion engine which will develop high torque over a broad range of variation in speed and is, therefore, comparable in terms of flexibility of operation to conventional reciprocating or so-called "piston-type" engines.

With the above and other objects in view, my invention resides in the novel features of form, construction, arrangement, and combination of parts presently described and pointed out in the claims.

Referring now in more detail and by reference characters to the drawings which illustrate a preferred embodiment of the present invention, A designates a rotary internal combustion engine comprising an annular steel shell or cylinder block 1 having the shape of an oblate cylinder and including two hemi-cylindrical side walls 2, 3, integrally connected by straight parallel top and bottom walls 4, 5, which are, in turn, respectively provided with coaxial aligned upwardly and downwardly projecting intake ports 6, 7, having annularly projecting flat mounting flanges 8, 9. For convenience, the walls 4, 5, are respectively referred to herein as top and bottom walls, and the engine A is shown in the drawings in substantially vertical position, but it should be understood that this orientation is optional. The engine A may actually be mounted in any desired position and will be fully operative.

Figure 1:
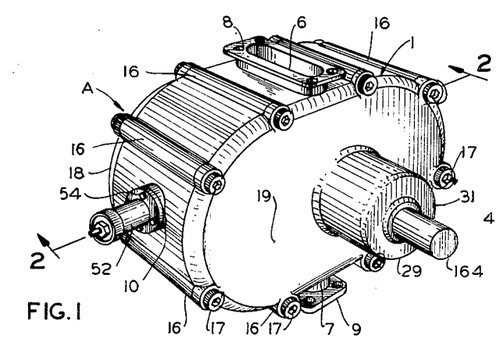
FIG. 1 is a perspective view of a rotary internal combustion engine constructed in accordance with and embodying the present invention.
Figure 2:
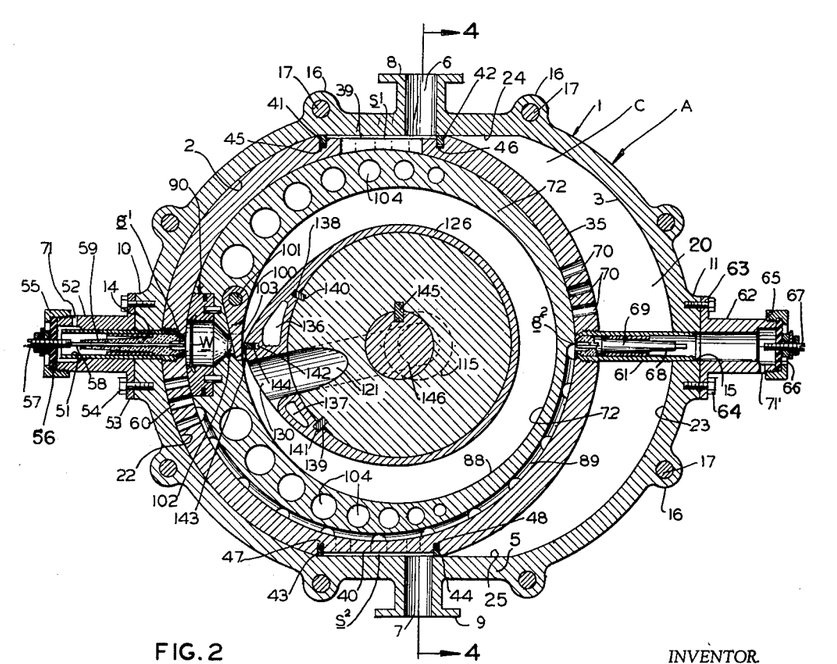
FIG. 2 is a transverse sectional view taken along line 2—2 of FIG. 1.

As will be seen by reference to FIGS. 1 and 2, the intake ports 6, 7, are located substantially along the centerline of the flat top and bottom walls 4, 5, and are elongated in the axial direction so as to extend substantially across the entire axial length of the top and bottom walls 4, 5, respectively. Similarly formed centrally of the circular walls 2, 3 in 90° spaced relation to the intake ports 6, 7, are radially projecting cylindrical bosses 10, 11, which are located midway between the laterally presented end faces 12, 13, of the shell 1 and are radially drilled to provide coaxially aligned cylindrical apertures 14, 15.

The shell 1 is also integrally provided at uniformly spaced intervals around its outer peripheral surface with axially extending hemi-cylindrical bosses 16 which are axially drilled and tapped for endwise receiving a plurality of bolts 17 by which flat steel end plates 18, 19, are respectively secured to the end faces 12, 13. In this connection, it should be noted that the end faces 12, 13, are machined so as to be precisely parallel and lie in planes which are perpendicular to the axial centerline of the shell 1. Moreover, the faces 12, 13, and the matching inwardly presented faces 20, 21, of the end plates 18, 19, are preferably ground an lapped to a very high degree of smoothness so that when pulled tightly together by the bolts 17, it will be possible to achieve a pressure-tight seal without the need for gaskets. However, it will be obvious that some conventional type of gasketed-construction can be employed if desired. In any case, when bolted together in assembled relation, the shell 1 and the inwardly presented faces 20, 21, will conjointly form a tightly sealed somewhat cylindrical chamber C of oblate cross-sectional shaped defined by the continuous internal face of the shell 1 and the inwardly presented faces 20, 21, of the end walls 18, 19.

As will be seen by reference to FIG. 2, the interior face of the shell 1 actually consists of two hemi-cylindrical surfaces 22, 23, the axes of which are located along the common centerline of the aperture 14, 15, in equidistantly outwardly spaced parallel relation to and on opopsite sides of the axial centerline of the shell 1. These surfaces 22, 23, are joined to form a continuous interior surface by two precisely machined flat slide faces 24, 25, which are precisely parallel to the plane defined by the centerline of the apertures 14, 15, and the axial centerline of the shell 1 being located equidistantly on opposite sides of such plane. Finally, it will be noted by reference to FIG. 5 that the inwardly presented faces 20, 21, of the end plates 18, 19, are precisely perpendicular to the axial centerline of the shell 1 and are located equidistantly on opopsite sides of the centerline of the apertures 14, 15. These faces 20, 21, are, therefore, precisely parallel to each other, and as above indicated, are machined and ground to a high degree of smoothness. This is true irrespective of whether or not the seal between the shell 1 and the end plates 18, 19, is achieved by lapping or by conventional gasketing techniques.

Figures 4, 5, 6:
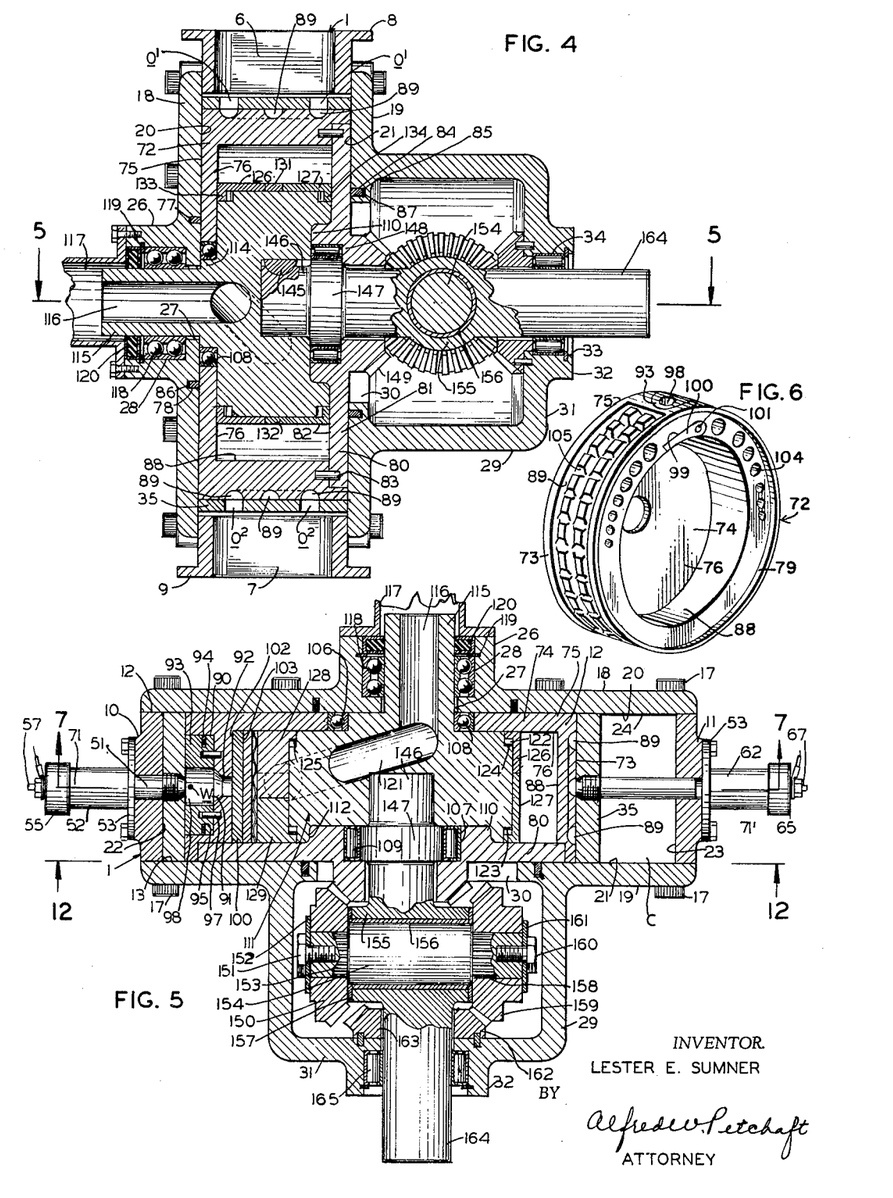
FIG. 4 is a sectional view taken along line 4—4 of FIG. 2.
FIG. 5 is a sectional view taken along line 5—5 of FIG. 4.
FIG. 6 is a perspective view of the intermediate ring forming a part of the present invention.

The end plate 18 is centrally provided with an axially outwardly projecting boss 26 which is concentrically drilled and counterbored to provide a circular shaft opening 27 and a bearing recess 28. Similarly, the end plate 19, is integrally provided with an axially projecting cylindrical housing or gear box 29 which opens into the chamber C through a circular aperture 30. The gear box 29 is, furthermore, integrally provided at its outer end with a transverse end wall 31 disposed in outwardly spaced parallel relation to the main body of the end plate 19, the end wall 31, being, in turn, integrally provided with an axially projecting boss 32 which is drilled an counterbored in the provision of a circular shaft opening 33 and bearing recess 34. The circular shaft openings 27 and 33 and the bearing recesses 28 and 34 are co-axial, and the circular aperture 30 is concentric with respect thereto, all as best seen in FIG. 5 and for purposes presently more fully appearing.

Operatively disposed within the chamber C is a cylindrical slide ring 35 which is precisely machined on its flat end faces 36, 37, and is of such axial size as to fit slidably between the inwardly presented faces 20, 21, of the end walls 18, 19. Moreover, the end faces 36, 37, are preferably lapped against the faces 20, 21, so as to effect a substantially pressure tight seal and obviate the need for special sealing elements such as piston rings and the like. The outer cylindrical surface 38 of the slide ring 35 is milled or otherwise cut away along its upper and lower portions to provide flat faces 39, 40, which are parallel to and spaced downwardly from the flat surfaces 24, 25 of the shell 1. At each transverse extremity of the surfaces 39, 40, the slide ring 35 is axially grooved and provided with upwardly projecting hardened steel sealing blades 41, 42, 43, 44, each of which is biased upwardly into seal-forming sliding contact by means of sinuously curved ribbon springs 45, 46, 47, 48, respectively. The transverse length of the surfaces 39, 40, that is to say the perpendicular distances between the pairs of blades 41–42 and 43–44, is slightly greater than one-half of the corresponding transverse length of the faces 24, 25. Thus, when the slide ring 35 is in either of its extreme positions or in any intermediate position, the intake ports 6, 7, will always be in communication with the spaces $s^1$, $s^2$, between the respective opposed pairs of faces 24–39 and 25–40, which spaces $s^1$, $s^2$, are sealed off between the pairs of blades 41–42 and 43–44, all as best seen in FIG. 2. Moreover, the spaces $s^1$, $s^2$, communicate with the interior of the slide ring 35 through pairs of elongated openings $o^1$, $o^2$, respectively.

Figure 3:
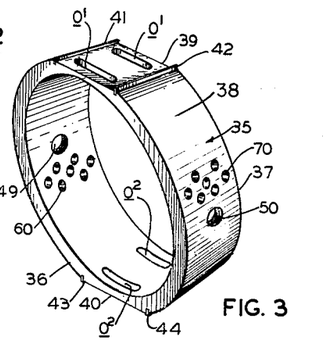
FIG. 3 is a perspective view of the internal slide ring forming part of the present invention.

The slide ring 35 is furthermore provided with diametrally opposite internally threaded apertures 49, 50, which are concentric with the centerline of the apertures 14, 15. Threadedly seated in the aperture 49 and extending radially outwardly therefrom is a cylindrical tube 51 which is snugly but slidably seated within the aperture 14 and projects outwardly therethrough into an elongated cylindrical sleeve 52 which is provided at its inner end with a diametrally enlarged flange 53 for receiving a plurality of bolts 54, by which the sleeve 52 is securely mounted upon the boss 10. At its outer end, the sleeve 52 is externally threaded for receiving an annular flange collar 55 which retentively bears upon a heavy dielectric disk 56 which is thereby held in place in closure-forming position against the outer end of the sleeve 52 and supports a threaded electrical binding post 57 which projects axially into the sleeve 52 for momentary endwise abutting contact against a rod-like electrode 58 extending axially through and mounted in a porcelain spark plug body 59. At its inner end the electrode 58 projects into a small socket like recess or spark gap $g^1$ formed in the inner end of the spark plug body 59. It will be noted that the inner end of the electrode 58 is located approximately flush with the internal cylindrical surface of the slide ring 35. Just below the aperture 49, the slide ring 35 is provided with a plurality of circular ports 60 which provide communication between the chamber C and the interior of the slide ring 35, all as best seen in FIGS. 2 and 3 and for purposes presently more fully appearing.

Theadedly seated in the aperture 50 and extending radially outwardly therefrom is a cylindrical tube 61 which is snugly but slidably seated within the aperture 15 and projects outwardly therethrough into an elongated cylindrical sleeve 62 which is provided at its inner end with a diametrically enlarged flange 63 for receiving a plurality of bolts 64, by which the sleeve 62 is securely mounted upon the boss 11. At its outer end, the sleeve 62 is externally threaded for receiving an annular flange collar 65 which retentively bears upon a heavy dielectric disk 66 which is thereby held in place in closure-forming position against the outer end of the sleeve 62 and supports a threaded electrical binding post 67 which projects axially into the sleeve 62 for momentary endwise abutting contact against a rod-like electrode 68 extending axially through and mounted in a porcelain spark plug body 69. At its inner end the electrode 68 projects into a small socket like recess or spark gap $g^2$ formed in the inner end of the spark plug body 69. It will be noted that the inner end of the electrode 68 is located approximately flush with the internal cylindrical surface of the slide ring 35. Just above the aperture 50, the slide ring 35 is provided with a plurality of circular ports 70 which provide communication between the chamber C and the interior of the slide ring 35, all as best seen in FIGS. 2 and 3, and for purposes presently more fully appearing.

In this connection, it should be noted that the cylindrical tubes 51, 61, are preferably fitted into the apertures 14, 15, respectively by lapping so that a reasonably pressure-tight sliding fit is secured and, similarly, the sleeves 52, 62, are vented to atmosphere through apertures 71, 71', respectively, so as to prevent the build up of pressure within the sleeves 52, 62, as the tubes 51, 61, move responsive to reciprocating movement of the slide ring 35.

Lapped into and rotatably fitted within the slide ring 35 is an intermediate ring 72 which integrally includes an external cylindrical surface 73 and a flat end walls 74 having precisely machined flat outer and inner faces 75, 76, which are perpendicular to the axial centerline of the shell 1. The outer face 75 bears slidably against a relatively large diameter sealing ring 77 set into an axial groove 78 cut into the face 20 of the end plate 18. Similarly, the opposite axial end face of the ring 72 is annularly undercut to provide a circular groove 79 and seated therein is a circular closure plate 80 having precisely machined outer and inner flat faces 81, 82. The plate 80 is staked in place by means of pins 83, and as a matter of added precaution, the outer flat face 81 is slidably seated against a sealing ring 84 seated within a circular groove 85 cut into the face 21 of the end plate 19. It should be noted that the sealing rings 77 and 84 are respectively biased outwardly into sealing engagement with the faces 75 and 81 by means of sinuously shaped circular ribbon-steel strings 86, 87, which are of a type more or less conventional in the piston ring art.

The intermediate ring 72 is provided with a smoothly machined circular inner surface 88 which is eccentric with relation to the external circular surface 73 and the latter is provided with a series of peripheral grooves 89 which are located interiorly of the planes of the outer faces 75, 81, and extend peripherally around the surface 73 from the thinnest part of the intermediate ring 72 for an arcuate distance of approximately 160°, terminating somewhat short of the thickest part of the intermediate ring 72, all as best seen in FIGS. 2 and 3 and for purposes presently more fully appearing.

At its thickest part, the intermediate ring 72 is radially bored to provide a cylindrical recess 90 having an obliquely tapered chordwise extending bottom wall 91 which is, in turn, provided with a central radially extending bore 92 opening inwardly upon the eccentric surface 88. Operatively fitted within the recess 90 is a hardened steel cylindrical block 93 which is grooved around its outer surface and operatively provided with a piston ring 94 urged outwardly into sliding engagement with the surface of the recess 90 by means of a sinuous ribbon-steel expander spring 95. The outer face 96 of the block 93 is machined and ground to an arcuate contour corresponding to the interior surface of the slide ring 35. In order to prevent the block 93 from twisting within the recess 90, it is slidably fitted upon a plurality of stake pins 97 which are rigidly mounted in and project perpendicularly outwardly from the bottom wall 91 of the recess 90. Finally, the block 93 is centrally provided with a cylindrical bore 98 which is concentric with and of the same diametral size as the bore 92. The bores 92, 98, in common, form a cylinder space or combustion chamber $s^3$ and are smaller in diametral size than the axial distance between adjacent margins of the slots $o^1$, $o^2$, being located so as to pass between them. Consequently, there is no communication between the combustion chamber $s^3$ and the slots $o^1$, $o^2$. Rigidly mounted at its end and extending diametrally across the bore 98 is a small diameter electrically conductive wire $w$ which cooperates with the inner ends of the electrodes 58, 68, whenever it comes into position thereto so as to produce an explosion initiating spark somewhat in the manner of a conventional spark plug.

The interior eccentric surface 88 of the ring 72 is milled out to provide a somewhat rectilinear recess 99 which extends entirely across the interior end of the bore 92 and projects laterally with respect thereto for an arcuate distance of approximately 20°. The recess 99 also extends entirely across the axial length of the ring 72 so as to open at its opposite ends respectively, against the inner faces 76, 80. Operatively seated within the recess 99 and lapped along its end faces against the surface 76, 82, is a segmentally-shaped hardened steel flap 100 which is pivoted upon a pin 101, the latter being parallel to the axial centerline of the shell 1 and located in laterally spaced relation to the centerline of the bore 92. The flap 100 is formed with inner and outer peripheral surfaces 102, 103, the latter being machined arcuately so as to form a substantially smooth continuous portion of the circular surface 97 when the flap 100 is disposed entirely within the recess 99. Moreover, the inner surface 102 is machined so that it will seat snugly against the interior face of the recess 99, and form a tight fitting closure across the interior end of the bore 92 when the flap 100 is seated wholly within the recess 99 as shown in FIG. 2.

As may be seen by reference to FIG. 6, the intermediate ring 72 is provided with a plurality of axially extending bores 104 which are located at spaced intervals along the thicker portion thereof for the purpose of lightening the weight of the thicker portion and establishing both static and dynamic balance around the geometric centerline of the surface 88. Furthermore, the grooves 89 are preferably cross-connected by a series of short axial grooves 105 which serve to facilitate the flow of a suitably carbureted fuel mixture.

The end wall 74 and the closure plate 80 are provided respectively with relatively large circular bearing-holes 106, 107, which are mutually concentric with the interior surface of the intermediate ring 72. A ball-bearing 108 is seated within the bearing-hole 106, and similarly a roller bearing 109 is seated within the bearing-hole 107. The circular plate 80 is further integrally provided on its interior face with an upstanding circular boss 110 which is also concentric with the bearing-holes 106, 107, and the eccentric circular surface 88 of the intermediate ring 72.

It will thus be evident that the intermediate ring 72 together with its end wall 74 and circular plate 80 define a cylindrical inner chamber which is eccentric with respect to the slide ring 35 by a distance equal to the dimensional difference between the thickest and thinnest portions of the intermediate ring 72. This same amount of eccentricity exists between the bearing-holes 106, 107, and the bearing recesses 28, 34, which, of course, are concentric with and lie along the true axial centerline of the shell 1.

Disposed operatively within the chamber is a rotor 111 provided in its forward end face with a circular recess 112 sized to fit rotatably upon the boss 110. The rotor 111 is substantially of smaller diametral size than the interior surface 88 of the intermediate ring 72 and is concentric therewith. On its rear end face 113 (reference being made to the left hand face in FIG. 4), the rotor 111 is integrally provided with an axially extending boss 114, the outer cylindrical surface of which is journaled within the ball-bearing 108. Also formed integrally with the rotor 111 and projecting axially outwardly in loose fitting concentric relationship through the circular shaft opening 27 is a tubular stub shaft 115 having an internal axial passage 116 that opens into a relatively large duct 117. The tubular shaft 115 is operatively journaled in a compound ball-bearing 118 seated within the bearing recess 28 and held therein by means of a conventional snap ring. The tubular shaft 115 also extends operatively through a conventional rotary seal 120 mounted within the bearing recess 28 in outwardly spaced relation to the snap ring 119. Interiorly of the rotor 112, the passage 116 opens into a somewhat angularly and radial internal passage 121 which, in turn, opens upon the outer face of the rotor 111, all as best seen in FIG. 5, and for purposes presently more fully appearing.

The outer cylindrical surface of the rotor 111 is marginally machined to provide two outwardly presented annular recesses 122, 123, for receiving sinuous circular ribbon-steel expander springs 124, 125, which also are more or less of the type commonly employed in the piston ring art.

Operatively mounted upon the exterior cylindrical surface of the rotor 111 are two similarly shaped collar rings 126, 127, which are of substantially uniform cross-sectional shape for about one-half of their arcuate length and are progressively thickened around the other half of their arcuate length in the provision of matching lobes 128, 129, bored in common to provide a cylindrical passage 130 which registers with and opens interiorly into the passage 121 and, in turn, opens exteriorly into the chamber. On their inner transverse faces, the collar rings 126, 127, are castellated to provide a plurality of interfitting rectilinear tongues 131, 132, which are machined to a fairly close tolerance so as to permit relative axial movement of the collar rings 126, 127, upon the rotor 111.

The collar rings 126, 127, are respectively provided at their outer end faces with depending annular flanges 133, 134, respectively, which enter loosely into the recesses 122, 123, and bear against the springs 124, 125. Thus, the collar rings 126, 127, are urged outwardly into operative seal-forming engagement against the interior faces 75, 81. The collar rings 126, 127, are also axially provided, in their thickened portion, with lightening-holes 136, 137, which together with the material removed upon the passage 130 will serve to achieve static and dynamic balance for the rotor 111. Finally, the rotor 111 is milled out to provide two axial grooves 138, 139, for receiving axial keys 140, 141, which project operatively into the collar rings 126, 127, so that the latter are secured to the rotor 111 for rotation therewith but are, nevertheless, free to slide axially with respect thereto, all as best seen in FIG. 2.

The collar rings 126, 127, are also axially milled in common across the highest point of the lobes 128, 129, in the provision of an axial slot 142 which operatively receives an elongated hardened steel sealing bar 143 and a sinuously convoluted ribbon steel spring 144 adapted to bias the sealing bar 143 outwardly into engagement against the interior surface 88 of the intermediate ring 72, all as best seen in FIG. 2.

Secured at its rearward end by means of a Woodruff key 145 in the rotor 111 and projecting axially forwardly therefrom is a shaft 146 which is integrally provided with a diametrically enlarged journal-portion 147 operatively seated in the roller bearing 109. As will be seen by reference to FIGS. 2 and 5, this shaft 146 is concentric with the chamber X and is eccentric with reference to the axial center line of the shell 1. This eccentricity is dimensionally the same as the eccentricity between the inner surface 88 of the rotor 72 and the slide ring 35.

Formed integrally upon the outer face 81 of the end wall 80 is a tubular extension 148 which is concentric with, and of slightly larger diametral size than, the shaft 146. The tubular extension 148 is of substantially smaller external diametral size than the opening 30 so as to project loosely therethrough, and on its forward end the tubular extension 148 is hobbed to form a miter gear 149 which is disposed in meshing engagement with a matching planetary miter gear 150, the latter being rigidly mounted by means of a bolt 151 and washer 152 upon the diametrally reduced splined end 153 of a jack shaft 154 which is journaled in, and extends transversely through, a hub element 155 formed integrally upon the forward end of the shaft 146.

As will be seen by reference to FIG. 5, the hub element 155 and the axis of rotation of the jack shaft 154 are perpendicular to the center line of the shaft 146. Moreover, the jack shaft 154 is journaled within an antifriction sleeve 156 which is operatively mounted within the hub element 155. Finally, an anti-friction thrust washer 157 is interposed between the miter gear 150 and the proximate end face of the hub element 155. The jack shaft 154 is also provided with another diametrally reduced splined end 158 which projects co-axially on the opposite side of the hub element 155 and is provided with a second planetary miter gear 159 held in place by means of a bolt 160 and washer 161. This second planetary miter gear 159 meshes operatively with a matching stationary miter gear 162 mounted rigidly upon the interior transverse face of the end wall 31 of the gear box 29 and is centrally provided with a diametrally enlarged bore 163 and loosely embraces a drive shaft 164 which is integrally connected at its inner or rear end to the forward portion of the hub element 155 and projects operatively outwardly from the gear box 29 through a conventional roller bearing 165 seated within the bearing recess 34. The drive shaft 164 is concentric with the axial center line of the shell 1 and, of course, correspondingly eccentric to the shaft 146. By reason of this eccentricity and the relative diameters of the miter gears 149, 162, the first planetary miter gear 150 will mesh only with the miter gear 149 and the second planetary miter gear 159 will mesh only with the stationary miter gear 162. Consequently, as the shaft 164 rotates in a counter-clockwise direction, the intermediate ring 72 and its associated structure will rotate in a clockwise direction. Similarly, the rotor 111, which is keyed upon the shaft 115, will rotate in a clockwise direction with reference to its own axial centerline and will also rotate orbitally around the axial centerline of the shell 1, which, of course, is the axial centerline of the shaft 164 and the tubular shaft 115. The relative counter-rotation between the rotor 111 and the intermediate ring 72, together with the orbital movement of the rotor 111, will cause the slide ring 35 to reciprocate transversely across the chamber C from the position shown in FIG. 7 to the position shown in FIG. 10 and back again to the position shown in FIG. 7 during one complete cycle.

The intake ports 6, 7, are conventionally connected to a suitable carbureted fuel supply (not shown) from which a properly proportioned mixture of gasoline and air is supplied to the engine A. Incidentally, for purposes of lubrication, oil may be mixed with the liquid gasoline prior to carburetion in the manner commonly practiced with many types of so-called "outboard" motors. It should, however, be noted in this connection that the various bearing and sliding surfaces of the engine A can be directly lubricated with a liquid lubricant supplied under pressure through conventional oil ducts of the drilled-hole type, if desired. This latter type of lubrication system is quite common practice in the internal combustion engine art and is, therefore, not illustrated or described in detail herein.

Figure 7:
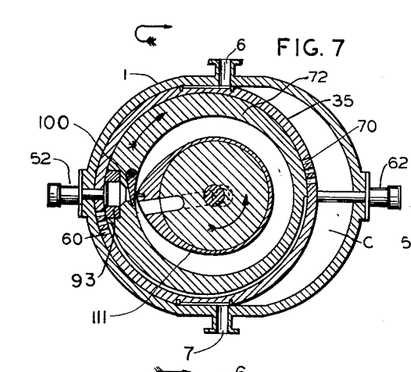
FIGS. 7, 8, 9, 10, and 11, are transverse sectionalized schematic views of the rotary internal combustion engine taken approximately along line 7—7 of FIG. 5 illustrating the relative positions of the various operating parts thereof at various stages of the cycle.
Figure 10:
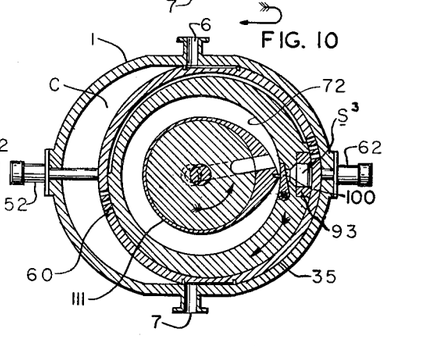
Figure 11:
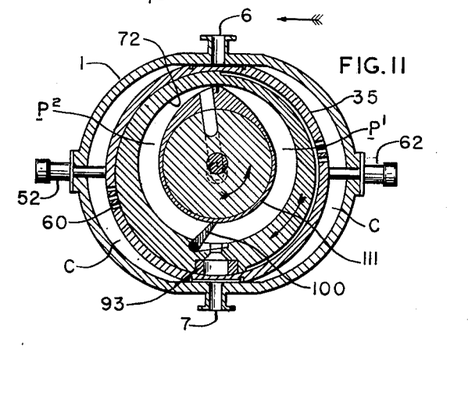
Figure 12:
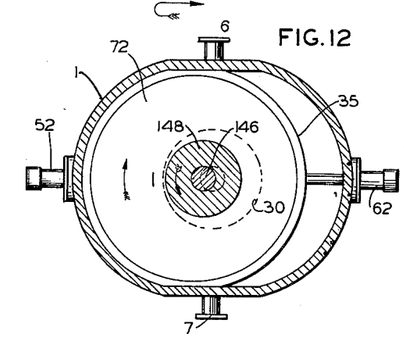
FIGS. 12, 13, 14, 15, and 16 are transverse sectionalized schematic views of the rotary internal combustion engine taken approximately along line 12—12 of FIG. 5, further illustrating the relative positions of the various operating parts thereof in various stages of the cycle, comparable respectively to FIGS. 7, 8, 9, 10 and 11.
Figure 13:
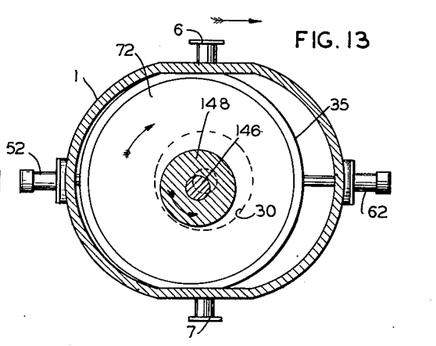
Figure 14:
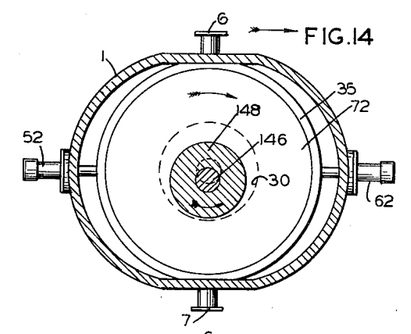
Figure 15:
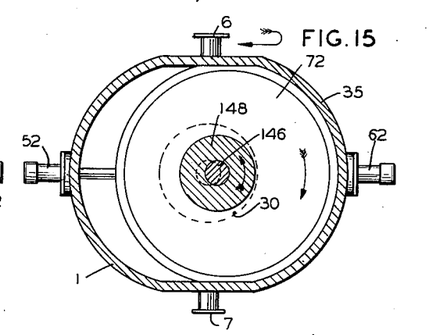
Figure 16:
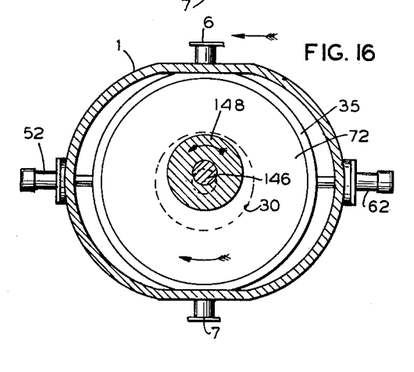

In order to understand the operation of the rotary internal combustion engine A, it may be assumed that the electrodes 58, 68, are connected to one pole of a conventional electric current supply so as to be capable of generating sparks at appropriate times in each cycle and it may also be assumed that the drive shaft 164 has been rotated by some conventional cranking or starting device so that the internal parts of the engine A will be moved from the position shown in FIG. 10 through the position shown in FIG. 11 to the position shown in FIG. 7. As this occurs, a carbureted fuel-air mixture will be drawn in through the upper intake port 6, will flow through the slots $o^1$, travel around through the passages 89, and be drawn into the progressively enlarged right-hand portion of the chamber C through the openings 70 in the slide ring 35. By the time the slide ring 35 and the other internal parts of the engine A reach the position shown in FIG. 7, the righthand portion of the chamber C will be fully charged with the fuel-air mixture and the trailing ends of the passages 89 will have passed downwardly out of communication with the openings 70.

Figure 8:
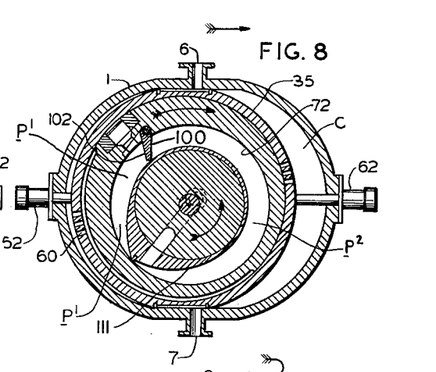
Figure 9:
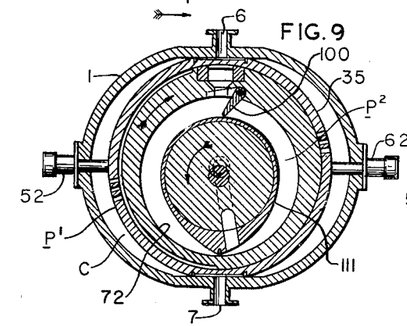

If it then be assumed that the moving parts of the rotary internal combustion engine A be rotated as a result of further cranking action through the position shown in FIGS. 8 and 9 back to the position shown in FIG. 10, it is obvious that two things will occur simultaneously. In the first place, the inducted fuel-air mixture will be confined within the righthand portion of the chamber C, which now becomes progressively smaller, placing such inducted fuel-air mixture under high pressure. Just before the intermediate ring 72 reaches the position shown in FIG. 10, it will pass in front of the aperture 70 of the slide ring 35. At this moment in the cycle, the highly compressed fuel-air mixture will flow through the apertures 70 into the cylinder space $s^3$ formed by the bores 92, 93. At about the same period in the cycle, the rotor 111 which is rotating in the opposite direction to the intermediate ring 72, will move up from the bottom so that the sealing bar 143 will ride against the flap 100, forcing it to closure-forming fully seated position within the recess 99. An instant later in the cycle, the intermediate ring 72 will reach the position shown in FIG. 10 and a spark generated between the electrode 68 and the wire $w$ will ignite the highly compressed fuel-air mixture within the cylinder space $s^3$.

At the instant of explosion, the rotor 111 will have reached such a position that the sealing bar 143 is passing beyond the free edge of the flap 100 so that the latter becomes free to swing outwardly against the peripheral faces of the collar rings 126, 127, and will, in effect, form a very narrow pocket $p^1$ which increases in size as the force of the explosion is expended against the receding face of the sealing bar 143 and the proximate areas of the outer surfaces of the collar rings 126, 127, thereby imparting propulsive force to the rotor 111. Meanwhile, the lefthand portion of the chamber C will have been filled with a properly carbureted fuel-air mixture and the slide ring 35, as it moves from right to left, will place this inducted gaseous mixture under high compression. Consequently, as the moving parts of the rotary internal combustion engine A reach the position shown in FIG. 7, the flap 100 will again be closed and the cylinder space $s^3$ will again be charged with a high-compression fuel-air mixture and will be exploded by the spark generated as the wire $w$ comes into juxta-position with the inner end of the electrode 58. At this moment, the so-called pocket $p^1$ will have, in effect, disappeared and the entire interior of the chamber, which is by now filled with exhaust gases, will be in communication with the exhaust duct 117 through the passages 116, 121, and 130. It will, of course, be evident that as the rotor 111 continues its counter-clockwise position from the position shown in FIG. 7 to the positions successively shown in FIGS. 8 and 9, the chamber X will again be sub-divided into a high-pressure explosion pocket $p^1$ and an exhaust pocket $p^2$, although the relative positions of the pockets $p^1$ and $p^2$ will be reversed as compared with the first half of the cycle above described. It will also be apparent that the exhaust pocket $p^2$ will be of diminishing volume as the rotation of the rotor 112 continues and the exhaust gases trapped within the exhaust pocket $p^2$ will be thus purged therefrom and swept out into the exhaust duct 117. The rotary internal combustion engine A thereafter will receive two power impulses during each cycle of rotation.

It should be understood that change and modifications in the form, construction, arrangement and combination of the several parts of the rotary internal combustion engines may be made and substituted for those herein shown and described without departing from the nature and principle of my invention.

Having thus described my invention, what I claim and desire to secure by Letters Patent is:

1. A rotary internal combustion engine comprising a cylinder block, an intermediate element operatively mounted in the block for rotary movement therein, said intermediate element having an eccentric chamber adapted for orbital movement around the axis of rotation of the intermediate element, said intermediate element also having a combustion chamber formed therein in laterally spaced relation to the eccentric chamber, a drive shaft journaled in and extending axially through the block, said drive shaft further having an offset crank-portion which extends through the eccentric chamber, means for mechanically coupling the drive shaft and the intermediate element so that as the drive shaft rotates in one direction the intermediate element rotates in the opposite direction, a rotor mounted on and carried by the crank-portion, said rotor having means for effecting sealed sliding engagement with the walls of the eccentric chamber, means for charging the combustion chamber with an explosive fuel mixture, means for igniting said explosive fuel mixture to produce explosive combustion thereof, means for transmitting the force generated by said explosive combustion to the rotor, and means for exhausting the gaseous products of said explosive combustion at low pressure to the exterior of the block.

2. A rotary internal combustion engine comprising a cylinder block, an intermediate element operatively mounted in the block for rotary movement therein, said intermediate element having an eccentric chamber adapted for orbital movement around the axis of rotation of the intermediate element, said intermediate element also having a combustion chamber formed therein in laterally spaced relation to the eccentric chamber, means in the block for causing the intermediate element to shift laterally to-and-fro as it rotates, a drive shaft journaled in and extending axially through the block, said drive shaft further having an offset crank-portion which extends through the eccentric chamber, means for mechanically coupling the drive shaft and the intermediate element so that as the drive shaft rotates in one direction the intermediate element rotates in the opposite direction, a rotor mounted on and carried by the crank-portion, said rotor having means for effecting sealed sliding engagement with the walls of the eccentric chamber, means for charging the combustion chamber with an explosive fuel mixture, means for igniting said explosive fuel mixture to produce explosive combustion thereof, means for exhausting the gaseous products of said explosive combustion at low pressure to the exterior of the block and means for transmitting the force generated by said explosive combustion to the rotor.

3. A rotary internal combustion engine according to claim 1 in which the means for exhausting the gaseous products of combustion is a duct extending through the drive shaft and rotor communicating at one end with the eccentric chamber and at the other end with the ambient exteriorly of the block.

4. A rotary internal combustion engine according to claim 1 in which the means for exhausting the gaseous products of combustion is a duct extending through the drive shaft and rotor communicating at one end with the eccentric chamber on the side thereof opposite to that which receives the propulsive force, and at the other end with the ambient exteriorly of the block.

5. A rotary internal combustion engine according to claim 1 in which the means associated with the rotor for sealing sliding engagement with the walls of the eccentric chamber consist of a pair of castellated collars having axially interfitting fingers, said collars being keyed to the rotor for rotation therewith while being free for limited axial shifting movement with respect thereto, and spring means interposed between the rotor and each of said collars for biasing said collars into sealing engagement with the walls of the eccentric chamber.

6. A rotary internal combustion engine according to claim 1 in which the interior end of the combustion chamber communicates with the eccentric chamber and in which the means for transmitting the force generated by said explosive combustion to the rotor comprises a swinging flap rockably mounted in and carried by the intermediate element and adapted to swing into closure-forming position across the interior end of the combustion chamber.

7. A rotary internal combustion engine comprising a cylinder block provided with an internal chamber having a longitudinal axis and being elongated in cross-sectional shape, intake duct means extending through the body member and being connected to a source of explosive fuel mixture, a slide element operatively mounted within the chamber for reciprocation to-and-from in the direction of elongation whereby to divide the chamber into two compartments which alternately enlarge and diminish in volume in repetitive successive cycles responsive to said to-and-fro movement, means for alternately connecting said compartments to the intake duct means for a short period in each cycle, an intermediate element rotatably mounted within the slide element and being also adapted for reciprocation bodily to-and-fro therewith, the intermediate element being provided with an internal eccentric cylindrical space, the axial centerline of which is parallel with and eccentric to the longitudinal axis of the slide so as to be adapted for orbital movement around the latter axis as the intermediate element rotates, a rotor mounted within the eccentric cylindrical space and being adapted to rotate about the axial centerline of the eccentric cylindrical space and also move orbitally around the axial centerline of the cylindrical space in the slide element, means for causing the intermediate element to rotate in a direction counter to the direction of rotation of the rotor responsive to rotation of the rotor, a shaft in said rotor projecting axially outwardly from the eccentric cylindrical space in the intermediate element, said shaft being coaxial with the centerline of the eccentric cylindrical space and being connected externally of said eccentric cylindrical space by an offset portion to a drive shaft which is coaxial with the longitudinal axis of the chamber, said intermediate element having a combustion chamber formed therein, means for alternately connecting the combustion chamber to said compartments whereby said combustion chamber will be charged with explosive fuel mixture, said combustion chamber also being in communication at its other end with the eccentric space, closure means operatively mounted across said other end of the combustion chamber, radially projecting means on the rotor for holding the closure means in closed position as the combustion chamber passes each of said first and second port means, spark means for successively initiating explosions in said combustion chamber after said combustion chamber has respectively passed said first and second port means, said radially projecting means being so located on the rotor that it will have just passed beyond and released the closure means at the moment of each explosion, whereby the closure means can fly open and the force of the explosion will be directed against the radially projecting means of the rotor to produce turning thereof, and means for exhausting the gaseous products of said explosion at low pressure to the exterior of the cylinder block.

8. A rotary internal combustion engine comprising a cylinder block provided with an internal chamber having a longitudinal axis and being elongated in cross-sectional shape along a transverse centerline which is perpendicular to the longitudinal axis, intake duct means extending through the body member and being connected to a source of explosive fuel mixture, a slide element operatively mounted within the chamber for reciprocation to-and-fro along said transverse centerline whereby to divide the chamber into two compartments which alternately enlarge and diminish in volume responsive to said to-and-fro movement, said slide element having first port means extending therethrough and opening into one of said compartments, said slide means also having second port means extending therethrough and opening into the other of said compartments, said slide element having an internal cylindrical space the axial centerline of which is parallel to said longitudinal axis and is located for movement along the transverse centerline, an intermediate element operatively mounted within the cylindrical space of the slide element for reciprocation bodily to-and-fro therewith and being adapted for rotation with respect thereto about the axial centerline of said cylindrical space, the intermediate element being provided with an internal eccentric cylindrical space, the axial centerline of which is parallel with and eccentric to the axial centerline of the cylindrical space in the slide so as to be adapted for orbital movemnet around the latter centerline as the intermediate element rotates, a rotor mounted within the eccentric cylindrical space and being adapted to rotate about the axial centerline of the eccentric cylindrical space and also move orbitally around the axial centerline of the cylindrical space in the slide element, means for causing the intermediate element to rotate in a direction counter to the direction of rotation of the rotor responsive to rotation of the rotor, a shaft in said rotor projecting axially outwardly from the eccentric cylindrical space in the intermediate element, said shaft being coaxial with the centerline of the eccentric cylindrical space and being connected externally of said eccentric cylindrical space by an offset portion to a drive shaft which is coaxial with the longitudinal axis of the chamber, said intermediate member having channel means for successively and separately connecting the intake duct means to said first port means and said second port means whereby said compartments will be successively charged with said fuel mixture, said intermediate element having a combustion chamber formed therein, said explosion chamber communicating at one end with the outer periphery of the intermediate member, whereby to be successively in communication for a predetermined period in each cycle with said first port means and said second port means, said combustion chamber also being in communication at its other end with the eccentric space, closure means operatively mounted across said other end of the combustion chamber, radially projecting means on the rotor for holding the closure means in closed position as the combustion chamber passes each of said first and second port means, spark means for successively initiating explosions in said combustion chamber after said combustion chamber has respectively passed said first and second port means, said radially projecting means being so located on the rotor that it will have just passed beyond and released the closure means at the moment of each explosion, whereby the closure means can fly open and the force of the explosion will be expended against the radially projecting means of the rotor to produce turning thereof, and means for exhausting the gaseous products of said explosion at low pressure to the exterior of the cylinder block.

9. A rotary internal combustion engine comprising a cylinder block provided with a chamber having an axial centerline and being elongated in a direction transverse to such centerline, intake duct means for admitting an explosive mixture into said chamber, a reciprocating element operatively mounted in the elongated chamber for to-and-fro movement and being interposed between the chamber and the intake duct means so as to act as a valve with respect thereto, said element having first port means, second port means and third port means, said first port means being adapted for communication with the intake duct means, said second port means communicating with one side of the chamber, said third port means communicating with the other side of the chamber, an intermediate member rotatably mounted in the reciprocating element, said intermediate member having an eccentric chamber and a radial chamber, the latter being arranged to open alternately to the second and third port means, said intermediate member also having duct means for connecting the first port means alternately with the second port means and the third port means, said reciprocating element having an axially extending internal cylindrical space, an intermediate cylindrical element operatively mounted within the cylindrical space of the slide element for reciprocation bodily to-and-fro therewith and being adapted for rotation with respect thereto about the axial centerline of said cylindrical space, the intermediate element being provided with an internal eccentric cylindrical space adapted for orbital movement around the centerline of the chamber as the intermediate element rotates, a rotor mounted within the eccentric cylindrical space and being adapted to rotate within eccentric cylindrical space and also move orbitally around the axial centerline of the cylindrical space in the slide element, means for causing the intermediate element to rotate in a direction counter to the direction of rotation of the rotor responsive to rotation of the rotor, a shaft in said rotor projecting axially outwardly from the eccentric cylindrical space in the intermediate element and being journaled in the intermediate element, said shaft being connected externally of said eccentric cylindrical space by an offset portion to a drive shaft which is coaxial with the longitudinal axis of the chamber, said intermediate member having channel means for successively and separately connecting the first port means in turn to said second port means and said third port means whereby said compartments will be successively charged with said fuel mixture, said intermediate element having a combustion chamber formed therein, said explosion chamber communicating at one end with the outer periphery of the intermediate member, whereby to be successively in communication for a predetermined period in each cycle with said second port means and said third port means, said combustion chamber also being in communication at its other end with the eccentric space, closure means operatively mounted across said other end of the combustion chamber, radially projecting means on the rotor for holding the closure means in closed position as the combustion chamber passes each of said second and third port means, spark means for successively initiating explosions in said combustion chamber after said explosion chamber has respectively passed said second and third port means, said radially projecting means being so located on the rotor that it will have just passed beyond and released the closure means at the moment of each explosion, whereby the closure means can fly open and the force of the explosion will be expended against the radially projecting means of the rotor to produce turning thereof, and means for exhausting the gaseous products of said explosion at low pressure to the exterior of the cylinder block.

10. A rotary internal combustion engine according to claim 7 wherein the slide element is provided with at least one laterally projecting tubular sleeve extending into the cylinder block and operatively sealed thereto by sliding seal means, and also wherein the spark means includes an electrode located in and carried by the tubular sleeve.

11. A rotary internal combustion engine according to claim 7 wherein the slide element is provided with at least one laterally projecting tubular sleeve extending into the cylinder block and operatively sealed thereto by sliding seal means, and also wherein the spark means includes an electrode located in and carried by the tubular sleeve, and means in said cylinder block for momentarily establishing an electrical circuit to said electrode at cyclical intervals.

12. A rotary internal combustion engine according to claim 7 wherein the slide element is provided with a pair of laterally projecting tubular sleves extending into the cylinder block and operatively sealed thereto by sliding seal means, and also wherein the spark means includes electrodes located in and carried by the tubular sleeves.

References Cited by the Examiner

UNITED STATES PATENTS

| 891,394 | 6/08 | Benson | 60—39.61 |
| 1,019,177 | 3/12 | Morton | 60—39.61 |
| 1,682,303 | 8/28 | Mohl | 123—8 |
| 2,937,499 | 5/60 | Klemt | 60—39.61 |
| 3,057,156 | 10/62 | Miyakawa | 60—39.61 |
| 3,073,118 | 1/63 | August | 60—39.61 |

SAMUEL LEVINE, *Primary Examiner.*